United States Patent
Kouchri

(10) Patent No.: US 8,306,018 B2
(45) Date of Patent: Nov. 6, 2012

(54) ENERGY STAR COMPLIANT VOICE OVER INTERNET PROTOCOL (VOIP) TELECOMMUNICATIONS NETWORK INCLUDING ENERGY STAR COMPLIANT VOIP DEVICES

(75) Inventor: Farrokh Mohammadzadeh Kouchri, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1312 days.

(21) Appl. No.: 12/012,623

(22) Filed: Feb. 4, 2008

(65) Prior Publication Data

US 2009/0196281 A1 Aug. 6, 2009

(51) Int. Cl.
*H04L 12/66* (2006.01)
(52) U.S. Cl. .......... 370/352; 370/311; 709/220
(58) Field of Classification Search .......... 713/300; 709/220, 223; 455/574, 414.3; 101/484; 370/352, 331
See application file for complete search history.

(56) References Cited

U.S. PATENT DOCUMENTS

| | | | | |
|---|---|---|---|---|
| 7,346,341 | B2* | 3/2008 | Costa-Requena et al. | 455/414.3 |
| 7,650,519 | B1* | 1/2010 | Hobbs et al. | 713/300 |
| 2004/0255008 | A1* | 12/2004 | Olsen et al. | 709/220 |
| 2005/0044430 | A1* | 2/2005 | Cheshire | 713/300 |
| 2005/0177627 | A1* | 8/2005 | Vollmer et al. | 709/220 |
| 2005/0221869 | A1* | 10/2005 | Liu et al. | 455/574 |
| 2006/0191435 | A1* | 8/2006 | Fujihara | 101/484 |
| 2007/0078959 | A1* | 4/2007 | Ye | 709/223 |
| 2008/0159265 | A1* | 7/2008 | Deng et al. | 370/352 |
| 2009/0040954 | A1* | 2/2009 | Usuba | 370/311 |

FOREIGN PATENT DOCUMENTS

EP  1855182  11/2007
WO  WO 2008070252  6/2008

OTHER PUBLICATIONS

PCT ISR Feb. 2, 2009 in PCT/US2009/032904, 4 pages.
Netgear: "Netgear achieves milestone of 100 Energy Star qualified products" Netgear press release [Online] Dec. 19, 2007, pp. 1-3.
EPA: "Energy Star Program Requirements for Computers (Version 4.0)" [Online] 2007, pp. 1-20.

* cited by examiner

*Primary Examiner* — Asad M Nawaz
*Assistant Examiner* — Parth Patel

(57) ABSTRACT

A Voice over Internet Protocol (VoIP) communications system, a method of managing a communications network in such a system and a program product therefore. The system/network includes an ENERGY STAR (E-star) aware softswitch and E-star compliant communications devices at system endpoints. The E-star aware softswitch allows E-star compliant communications devices to enter and remain in power saving mode. The E-star aware softswitch spools messages and forwards only selected messages (e.g., calls) to the devices in power saving mode. When the E-star compliant communications devices exit power saving mode, the E-star aware softswitch forwards spooled messages.

15 Claims, 3 Drawing Sheets

ENERGY STAR COMPLIANT VOICE OVER INTERNET PROTOCOL (VOIP) TELECOMMUNICATIONS NETWORK INCLUDING ENERGY STAR COMPLIANT VOIP DEVICES

ENERGY STAR or E-Star is a joint program of the U.S. Environmental Protection Agency (EPA) and the U.S. Department of Energy. The Government introduced ENERGY STAR in 1992 as a voluntary labeling program designed to identify and promote energy-efficient products to reduce greenhouse gas emissions.

BACKGROUND OF THE INVENTION

1. Field of the Invention

The present invention is related to conserving power in digital telecommunications systems and networks and more particularly, to expanding ENERGY STAR compliance in Voice over Internet Protocol (VoIP) based telecommunications networks and VoIP devices.

2. Background Description

Thus frequently, since 1992 state of the art electronic devices are designed for E-Star compliance. A typical E-Star compliant device has a low power, power saving mode for periods of non-use. When an E-Star device enters power saving mode, the device reduces operation, preferably in seamless coordination with current device usage.

A processor equipped E-Star device, for example, may enter its power saving state by the processor throttling down after a minimum period of inactivity, e.g., reducing processor execution speed. Throttling down sets the processor in a low-power, power saving operation that may be one of multiple different levels of power saving states. Thereafter, the processor may exit the current power saving state to respond to internal events or external events. Internal events may include, for example, a timer expiry. External events may include, for example, user initiated or network initiated events. Typical state of the art Voice over Internet Protocol (VoIP) phones and Multimedia Terminal Adapters (MTA) are sophisticated processor equipped telephony devices that normally include a display. Normally, these state of the art VoIP devices would be prime candidates for E-Star compliance.

Unfortunately, however, typical state of the art VoIP telecommunications systems require connected devices to be constantly available for frequent and very intensive communications and messaging between system telecom switches and network End-Points (EP), e.g., VoIP phones. Because these network messages occur with such frequency to place availability requirements on the EPs, the EPs may be prevented from remaining in power saving mode for an efficient length of time, or even from entering power saving mode. Otherwise, a VoIP device that is non-responsive (e.g., because it is in a power saving state) may be considered disconnected.

Consequently, typical VoIP phones could not enter and remain in a power saving state, even when the network messages to the phones may be unimportant. For example, at 2:00 am after 1 hour inactivity, an EP processor may be set to initiate power saving mode. However, normal message activity with the VoIP telecom switch may prevent it. Except for locally controlled minimal power saving functions, e.g., powering down the display, these availability requirements prevent EP devices from entering deeper power saving states at, e.g., hibernation.

Thus, there is a need for E-star telephony devices and network units that extend E-star compliance to EP devices in VoIP telephony systems.

SUMMARY OF THE INVENTION

It is a purpose of the invention to reduce power consumption in digital communications networks;

It is another purpose of the invention to extend ENERGY STAR (E-star) compliance in Voice over Internet Protocol (VoIP) communications devices at network end points in VoIP communications systems;

The present invention relates to a Voice over Internet Protocol (VoIP) communications system, a method of managing a communications network in such a system and a program product therefore. The system/network includes an ENERGY STAR (E-star) aware softswitch and E-star compliant communications devices at system endpoints. The E-star aware softswitch allows E-star compliant communications devices to enter and remain in power saving mode. The E-star aware softswitch spools messages and forwards only selected messages (e.g., calls) to the devices in power saving mode. When the E-star compliant communications devices exit power saving mode, the E-star aware softswitch forwards spooled messages.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
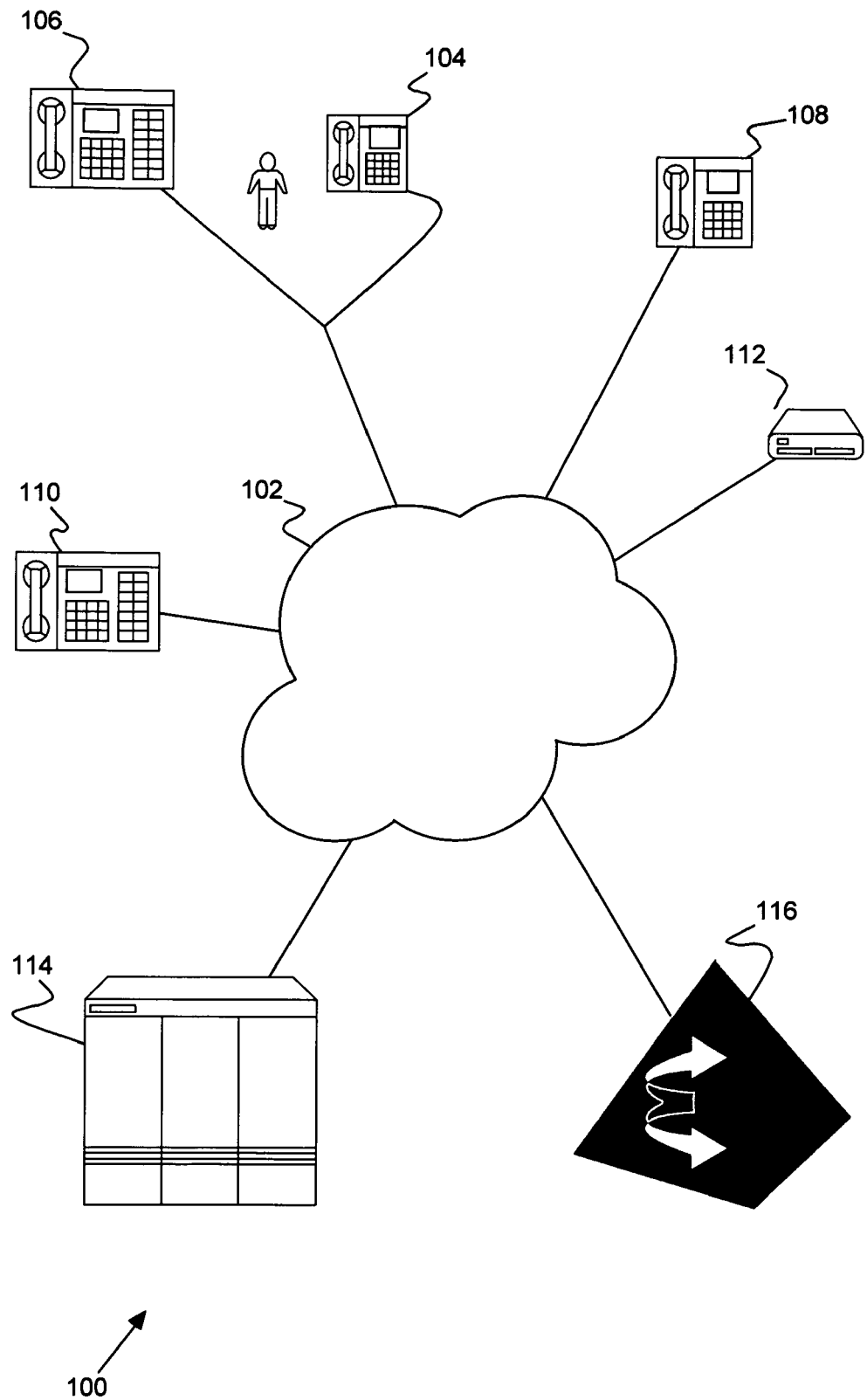
FIG. 1 shows an example of an Internet Protocol (IP) communications system including a digital call capable network with ENERGY STAR (E-Star) compliant End Points (EP) according to a preferred embodiment of the present invention.

Turning now to the drawings and more particularly, FIG. 1 shows an example of an Internet Protocol (IP) communications system 100 including a digital call capable network 102, e.g., capable of Voice over IP (VoIP) communications, with ENERGY STAR (E-Star) compliant End Points (EP) 104, 106, 108, 110, according to a preferred embodiment of the present invention. The system includes digital telephony devices (e.g., VoIP phones) and Multimedia Terminal Adapters (MTA), e.g., keysets at EPs 104, 106, 108, 110. Since a network device defines an EP, each EP and a device(s) at the EP are referred to herein interchangeably. A suitable proxy server 112 provides a router function to private network 102. A gateway 114, e.g., a state of the art media gateway, connects the network externally, e.g., to a public switched telephone network/public land mobile network (PSTN/PLMN). A preferred E-Star aware softswitch 116, e.g., a Media Gateway Controller (MGC) remotely located in a data center, manages calls to/from keysets 104, 106, 108, 110 from/to each other or through the gateway 114. In particular, these digital telephony devices 104, 106, 108, 110 cooperate with E-Star aware softswitch 116 to enable E-star compliance in these digital telephony devices according to a preferred embodiment of the present invention.

Preferably, communications in the system 100 are based on the Open Systems Interconnection (OSI) Basic Reference Model (OSI Reference Model or OSI Model), described in more detail hereinbelow. Preferably, digital telephony devices 104, 106, 108, 110 are sophisticated processor based VoIP devices, each with a local display. A typical such IP network telephony system has considerable messaging that occurs continuously, e.g., Call Processing (Call-P) messaging, status queries and features and availability queries. Call-P messages between telephony devices at the EPs 104, 106, 108, 110, and a switch, for example, E-Star aware softswitch 116, may or may not be for a phone call to the device(s) 104, 106, 108, 110. Generally, the preferred system 100 does not directly use the queries for signaling a phone call. However, previously, any time an EP device (the phone or MTA processor) received such a message, the device was required to process the message. Processing the message requires the phone or MTA to be active.

However, E-Star aware softswitch 116 is aware of the power state of connected E-Star compliant EP devices. Thus, the E-Star aware softswitch 116 controls messages and suppresses messaging to connected devices to allow these devices to enter and remain in low power except during actual use, e.g., between calls. A device may enter or change to a power saving state, e.g., throttle down to a reduced operation level, initiated internally or externally. Likewise, devices may exit or change to power saving states, also initiated by internal or external events. External events include, for example, user events or communication partner events. Devices may have different power saving states or levels, for different levels of operation. Further, except during normal activity (e.g., calls), the E-Star aware softswitch 116 allows E-Star devices to remain in low power for normal messaging.

Figure 2:
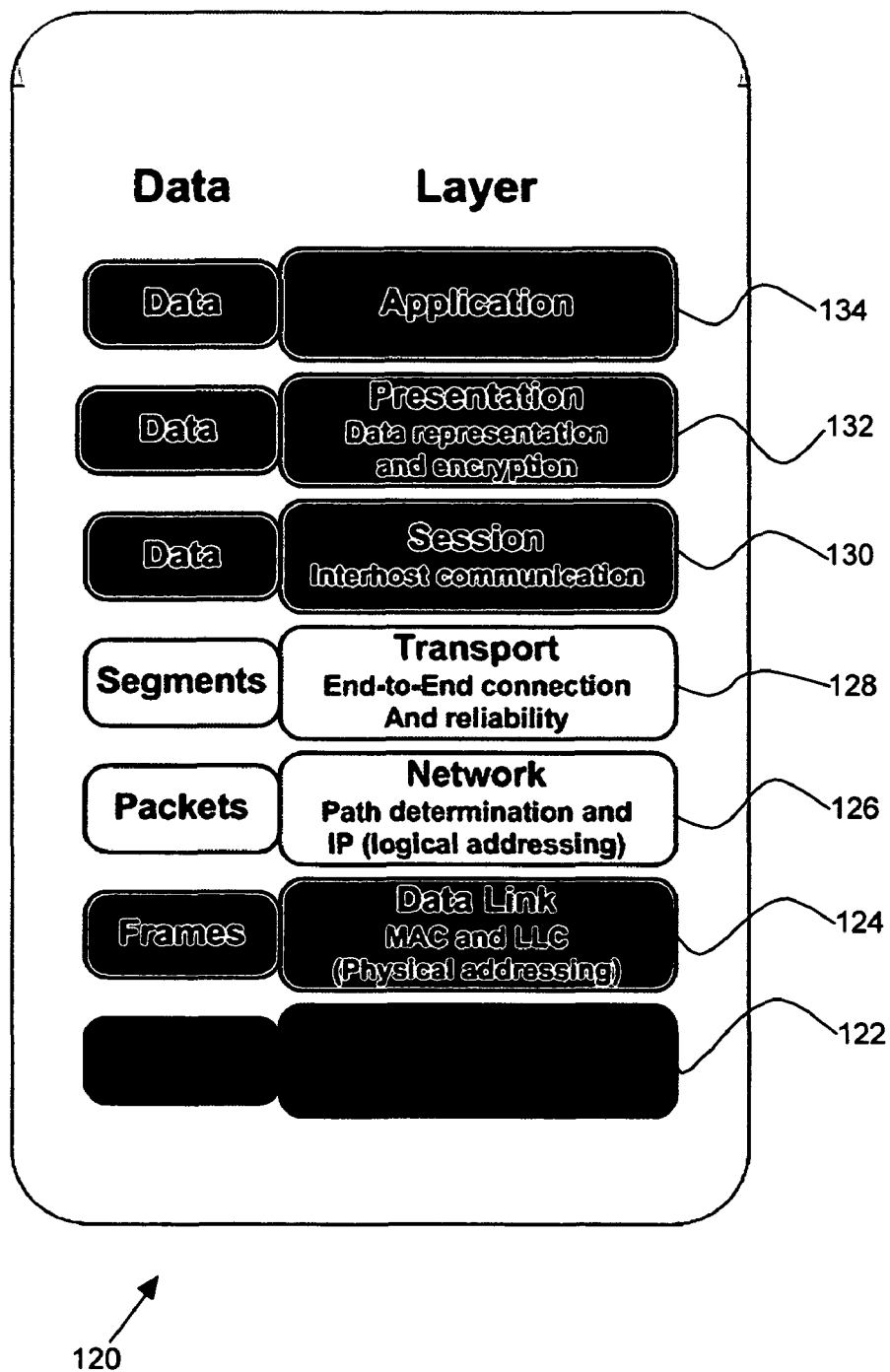
FIG. 2 shows an example of the OSI model.

FIG. 2 shows an example of the OSI model 120, which organizes network communications into layers 122-134, commonly designated L1-L7. Each layer 122-134 encompasses a collection of related functions that provide services to the layer above it (e.g., 124-132) and receive service from the layer below it (e.g., 132-122). These layers include a Physical layer 122, a Data Link layer 124, a Network layer 126, a Transport layer 128, a Session layer 130, a Presentation layer 132, and an Application layer 134.

The Physical layer 122 (L1) is the physical communications media, typically in a binary transmission signal, i.e., a serial bit stream. The Data Link layer 124 (L2) includes physical addressing information in Logical Link Control (LLC) and Media Access Control (MAC) sublayers, i.e., in frames embedded in the Physical layer 122. Ethernet is an example of a typical Data Link protocol. The Physical layer 122 and Link layer 124, typically, are handled by hardware (HW), e.g., a state of the art Network Interface Controller (NIC) chip. The Network layer 126 (L3) provides path determination and logical addressing for packets in the frames. IP is an example of a typical Network layer protocol. Some hardware may also handle the Network layer 126. These three lower level OSI model layers 122, 124 and 126 are known as the Media layers and are used in telecommunications. Even in power saving mode, preferred E-Star compliant EP device hardware handles the Media layers, identifying locally directed frames/packets for the particular device.

Data transfers, end-to-end in the Transport layer 128 (L4) with messages converted into segments, e.g., using a Transmission Control Protocol (TCP), User Datagram Protocol (UDP) or Stream Control Transmission Protocol (SCTP). The Session layer 130 (L5) provides interhost communications between devices, e.g., keysets 104, 106, 108, 110 and gateway 114. The Presentation layer 132 (L6) provides data encryption and representation. The Application layer 134 (L7) interfaces directly to, and performs application services for, application processes. The Application layer 134 also issues requests to the presentation layer 132. These four lower level OSI model layers 128, 130, 132 and 134 are known as the Host layers.

Unlike the Media layers 122, 124 and 126, responsibility for the Host layers 128, 130, 132 and 134 resides in software (SW) under processor control, e.g., central processing units (CPU) in networked the EP VoIP phones and MTA devices 104, 106, 108, 110 and 112. The CPUs also are responsible for processing applications (App). These processing Apps may include, for example, a Call-P App and a network message processing App. According to a preferred embodiment of the present invention, when an EP device 104, 106, 108, 110 and/or 112 is in a power saving state, the E-Star aware softswitch 116 limits Host layer communications to those devices in power saving mode depending on a requested communications level. It should be noted that the host layer communications of E-Star aware softswitch 116 always remains active to communicate with any other EP devices that are not currently in power saving mode. Communications can be limited, for example, for timing, e.g., increasing the no messaging time or omitting some messages, or for responding to state and status queries. Preferably also, each device and/or the E-Star aware softswitch 116 may change device operation level at any time.

Figure 3:
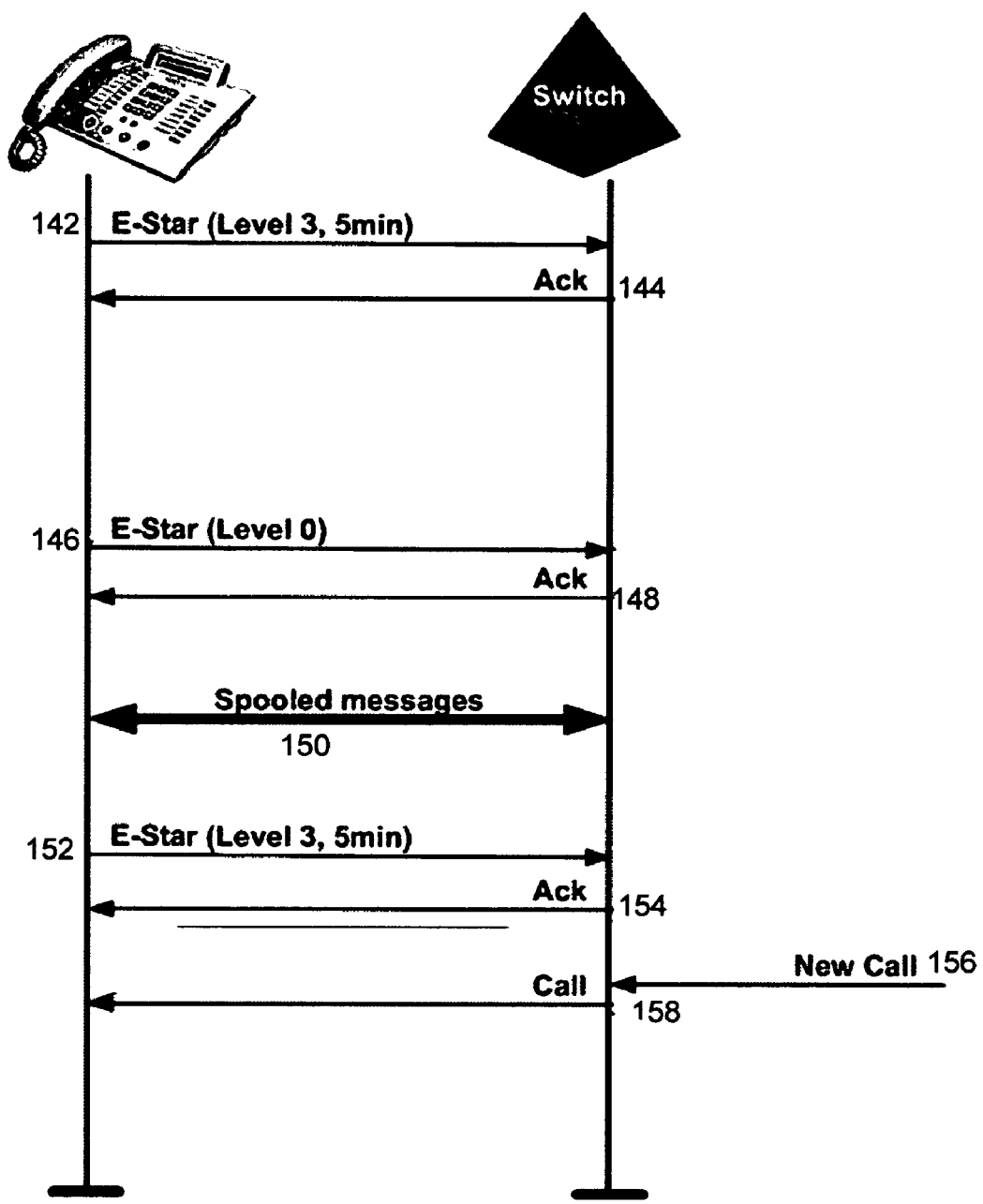
FIG. 3 shows an example of an E-Star device cooperating with E-Star aware softswitch, wherein between calls the E-Star device may enter and remain in a sleep state or even hibernate.

FIG. 3 shows an example 140 of an E-Star device, e.g., VoIP phone or MTA 106 in system 100 of FIG. 1, cooperating with E-Star aware softswitch 116, wherein the E-Star device 106 may enter a sleep state or even hibernate between calls, according to a preferred embodiment of the present invention. In this example, in 142 a software App of EP device 106 initiates entering a power saving state by signaling a request (an E-star request) to a current communication partner (e.g., E-Star aware softswitch 116), and indicates intention to enter a power saving state. Further, the EP device 106 indicates the power saving operation level (level 3) as well as the maximum time planned to stay in that state or mode, e.g., 5 minutes. The E-Star aware softswitch 116 maintains a definition of special settings for each power saving operation level, e.g., in a sleep level table (not shown), for each EP partner (phone/MTA), e.g., 106. The E-Star aware softswitch 116 responds 144 with an Ack message.

Thereafter, the E-Star aware softswitch 116 honors the power saving request for the requested period of time. During that period, 5 minutes in this example, the E-Star aware softswitch 116 spools events and communiqués for later, i.e., when the power saving ends. However, even though the E-Star device 106 is in power saving mode, the E-Star aware softswitch 116 signals all events characterized as important or wake-up events, e.g., incoming calls to the E-Star device 106.

As the planned low power time expires 146, the EP device 106 signals another E-star request, indicating (by power saving operation level 0), that the power saving period is ending. The E-Star aware softswitch 116 responds 148 with another Ack message. The active EP device 106 receives spooled messages 150, signaling with the E-Star aware softswitch 116. Once all spooled messages are received, the E-Star device 106 may enter another sleep state period, again signaling an E-star request 152 to the E-Star aware softswitch 116, which responds 154, with another Ack message. So, for example, when an incoming call for the E-Star device 106 reaches the E-Star aware softswitch 116, a call message 156 is forwarded to the E-Star device 106. Upon receiving the call message 156, the E-Star device 106 terminates power saving mode immediately, prior to the scheduled end, and the call proceeds normally.

Advantageously, the present invention extends E-star compliance in digital telephony devices for immediate energy savings and corresponding in cost savings, as well as. Further, periods of low power are less stressful for the device and, therefore extend device life, which also provides cost savings. Moreover, unlike typical telephones that remain at full power during normal operation (24×7), preferred devices in power saving mode uses significantly less power, thereby reducing the need for fossil fuel generated electricity and, correspondingly, facilitating environmental conservation by reducing $CO_2$ emissions.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A Voice over Internet Protocol (VoIP) communications system comprising:
    one or more communications devices at system endpoints, said one or more communications devices comprising a first communications device having at least one selectable power saving mode in which that device is on but operates so that the device utilizes less power than when in a non-power saving mode; and
    a switch device communicatively coupled to the one or more communications devices;
    the first communications device sending a first request to the switch device to indicate an intention to enter one of the at least one selectable power saving modes for a first predetermined period of time;
    in response to receiving the first request, the switch device spooling messages intended for the first communications device for the first predetermined period of time such that the spooled messages are not sent to the first communications device for the first predetermined period of time; and
    after the first predetermined period of time elapses, the switch device sending the spooled messages to the first communications device; and
    wherein upon a call to the first communications device the switch device signals said call to the first communications device and the first communications device exits the entered one of the at least one power saving mode upon receipt of the signaling of the call; and
    wherein the messages that are spooled are messages relating to predefined events that are characterized as not requiring immediate sending to the first communications device;
    wherein after receiving the spooled messages, the first communications device sending a second request to the switch device to indicate an intention to enter one of the at least one selectable power saving mode for a second predetermined period of time;
    the switch device spooling messages intended for the first communications device for the second predetermined period of time; and
    after the second predetermined period of time elapses, the switch device sending the messages spooled during the second predetermined period of time to the first communications device.

2. The VoIP communications system of claim 1 wherein the first communications device selects one of the at least one power saving mode in periods of identified inactivity.

3. The VoIP communications system of claim 1 wherein the at least one power saving mode of the first communications devices is comprised of multiple power saving modes.

4. The VoIP communications system of claim 1 wherein the switch device spools messages that are not calls during the first predetermined period of time and wherein the first communications device is a digital telephony device and the switch device is a softswitch.

5. The VoIP communications system of claim 1 wherein with one of the at least one power saving mode selected in the first communications device, the first communications device reduces processor execution speed.

6. A method of managing a communications network comprising:
    a) a communications device signaling that the communications device is entering a power saving mode for a predetermined period of time to a switch device;
    b) the communications device identifying a level of the power saving mode to the switch device;
    c) the switch device spooling messages for the communications device for the predetermined period of time such that the spooled messages are not sent to the communications device during the predetermined period of time;
    d) the communications device signaling to the switch device that the communications device is exiting said power saving mode; and
    e) in response to receiving the signaling indicating that the communications device is exiting the power saving mode, the switch device sending the spooled messages to the communications device; and
    f) the switch device sending an acknowledgement to the communications device in response to the signaling that the communications device exited the power saving mode; and
    wherein the switch device is a softswitch and wherein the switch device sends the spooled messages to the communications device after acknowledging the signaling from the communications device of the exiting of the power saving mode.

7. The method of claim 6 wherein the signaling step (a) comprises sending a power saving level and wherein the predetermined period of time is a maximum low power time and the communications device is a digital telephony device.

8. The method of claim 6 further comprising:
    the switch device sending an acknowledgement to the communications device; and
    the communications device entering the power saving mode.

9. The method of claim 6 further comprising:
    the switch device receiving a call for the communications device;
    the switch device signaling the call to the communications device;
    the communications device terminating the power saving mode and when the call is terminated the communications device signaling that the communications device is again entering the power saving mode.

10. The method of claim 9 further comprising the switch device sending the spooled messages to the communications device prior to the communications device again entering the power saving mode.

11. A non-transitory computer program product comprising a computer usable medium having computer readable program code stored thereon, said computer readable program code defining a method that is implemented upon execution of the computer readable program code, the method comprising:
- a switch device receiving signaling from a communications device indicating that the communications device is entering a power saving mode for a predetermined period of time to a switch device;
- the switch device spooling messages for the communications device for the predetermined period of time such that the spooled messages are not sent to the communications device until after the communications device exits the power saving mode;
- the switch device receiving signaling from the communications device indicating that the communications device is exiting said power saving mode; and
- the switch device sending the spooled messages to the communications device.

12. The computer program product of claim 11 wherein the switch device does not send any messages to the communications device during the predetermined period of time, wherein none of the messages are directed to an incoming call for the communications device.

13. The computer program product of claim 11 wherein the signaling from the communications device indicating that the communications device is entering the power saving mode identifies a power saving level and wherein the predetermined period of time is a maximum amount of time in which the communications device will be in the power saving mode.

14. The computer program product of claim 11 wherein the method further comprises:
- the switch device receiving a call for the communications device;
- the switch device signaling the call to the communications device such that the communications device terminates the power saving mode until the call is terminated.

15. The computer program product of claim 11 wherein the power saving mode results in the communications device reducing processor execution speed for the predetermined period of time.

* * * * *